United States Patent [19]
Teglbjarg

[11] Patent Number: 6,123,065
[45] Date of Patent: Sep. 26, 2000

[54] FEEDING BOTTLE

[76] Inventor: Caspar Teglbjarg, Lindet P1 2715, S-370 33 Tving, Sweden

[21] Appl. No.: 09/147,316

[22] PCT Filed: May 14, 1997

[86] PCT No.: PCT/SE97/00787

§ 371 Date: Dec. 2, 1998

§ 102(e) Date: Dec. 2, 1998

[87] PCT Pub. No.: WO97/47269

PCT Pub. Date: Dec. 18, 1997

[30]    Foreign Application Priority Data

Jun. 11, 1996  [SE]  Sweden .................................. 9602288

[51] Int. Cl.[7] ................. A61J 9/00; F25D 3/08; A47G 23/04
[52] U.S. Cl. ................. 126/263.09; 126/263.1; 126/262; 215/11.1; 62/457.3
[58] Field of Search ................. 126/263.01, 263.02, 126/263.04, 263.05, 263.06, 263.07, 263.08, 263.09, 261, 262, 263.03; 215/11.1, 11.2, 11.3; 219/43; 62/457.3, 457.2, 530

[56]    References Cited

U.S. PATENT DOCUMENTS 5,180,071  1/1993  Crosson .................................. 215/11.1

FOREIGN PATENT DOCUMENTS

19152/93  4/1994  Australia .
0562310   3/1993  European Pat. Off. .
048781    4/1994  European Pat. Off. .

Primary Examiner—Carl D. Price
Attorney, Agent, or Firm—Dennison, Scheiner, Schultz & Wakeman

[57]    ABSTRACT

A feeding bottle for infants useful for travelling and including a storage compartment for the nipple and a heater. The bottle includes an outer wall with an opening for the nipple at a first end and which turns inwardly at the opposite end defining a second opening, the wall terminating to form a closed portion within the bottle. The bottle thus includes a first storage space for the feeding material and a second storage space for the heater and for a nipple.

9 Claims, 6 Drawing Sheets

FEEDING BOTTLE

BACKGROUND OF THE INVENTION

The present invention relates to a feeding bottle generally consisting of a glass bottle or bottle of some other material, provided at its opening with a teat which is screwed on by means of some suitable arrangement. Usually the contents of the feeding bottle shall be warmed and this is at present impossible since the contents in the bottle is usually heated by placing the bottle in a saucepan of hot water. Furthermore, the actual teat of the feeding bottle is generally unprotected and may become dirty before the feeding bottle is used.

SUMMARY OF THE INVENTION

The purpose of the present invention is to provide a feeding bottle wherein, prior to use, the actual teat unit is protected, and wherein the feeding bottle is provided with one or more cylindrical spaces emanating from the bottom of the bottle, said space being closed at its upper end and open at its lower end so that a heat-generating unit can be placed in the space. It is suitable for the heating unit to be attached by means of screw threading. The heating cartridge may be of any suitable type, such as a battery connected in a resistance wire that generates heat. Another method of generating heat is to utilise two different substances which generate heat when mixed. The substances may be water and calcium chloride. The actual bottle is surrounded by a sleeve longer than the bottle in order to give the bottle rigidity and to provide a space beneath the bottom of the bottle into which a teat can be inserted so that it is protected, and also some nutrient. The lower end of the bottle is then closed by some suitable form of closure.

After the contents of the bottle has been heated, it is sometimes necessary to keep the contents warm for a predetermined period of time and this is possible if the bottle as such is similar to a vacuum flask. The wall of the bottle may be designed in this way along its entire length or substantially its entire length, with exception of the part defining the cylindrical space emanating from the bottom of the bottle. The wall of the bottle may then be constructed in exactly the same way as the wall of a conventional vacuum flask. Another way of achieving the same effect is to provide the exterior of the bottle with a coating which acts like a vacuum flask. In this case the wall of the cylindrical space emanating from the bottom of the bottle shall be free from coating.

According to a preferred embodiment of a feeding bottle in the form of a vacuum flask, it may consist of a tubular part designed in the same manner as the wall of a conventional vacuum flask. This tubular part is closed at the top and bottom. The bottom of the bottle thus consists of a separate unit and the cylindrical space that must exist within the bottle and which shall provide space for the means to heat the contents of the bottle, emanates therefrom.

BRIEF DESCRIPTION OF THE DRAWINGS

The actual closure of the bottle is such that is can be provided at its upper end with a sealing disc or a teat, as desired. The present invention will be described in more detail with reference to the accompanying drawings in which.

DESCRIPTION OF THE PREFERRED EMBODIMENTS

Figure 1:
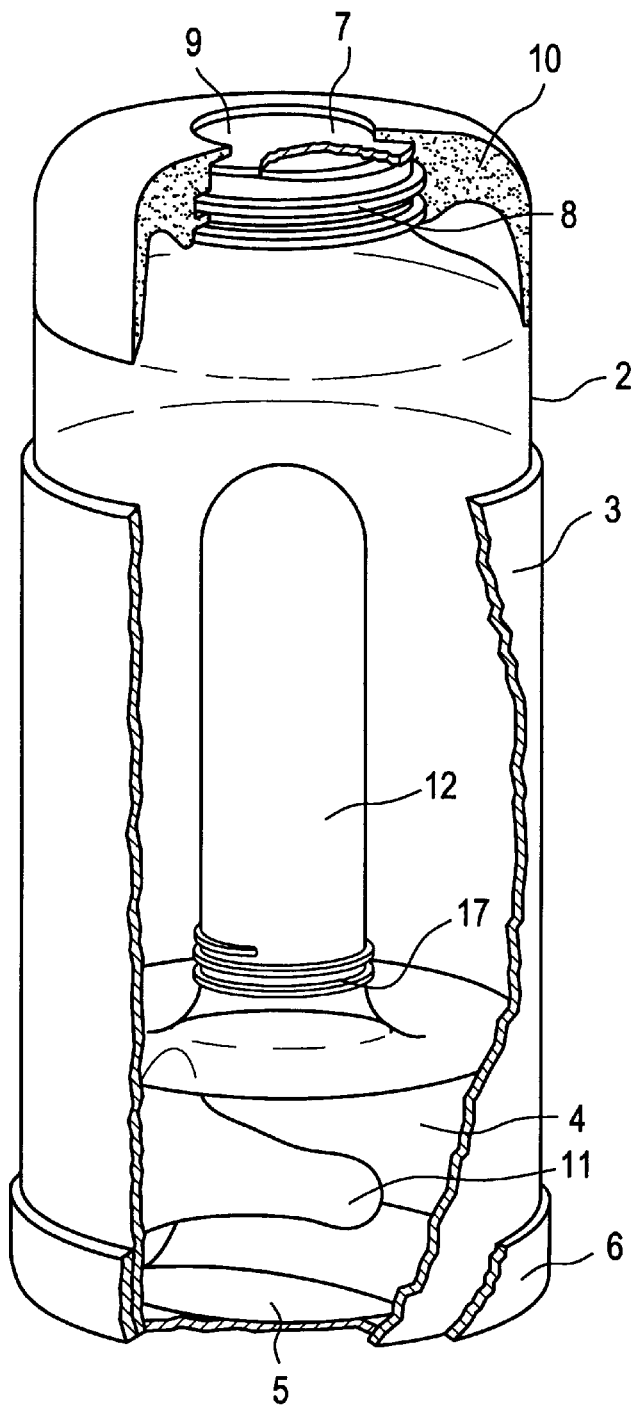
FIG. 1 shows a feeding bottle prior to use, which means that the bottle is closed at its upper end.
Figure 2:
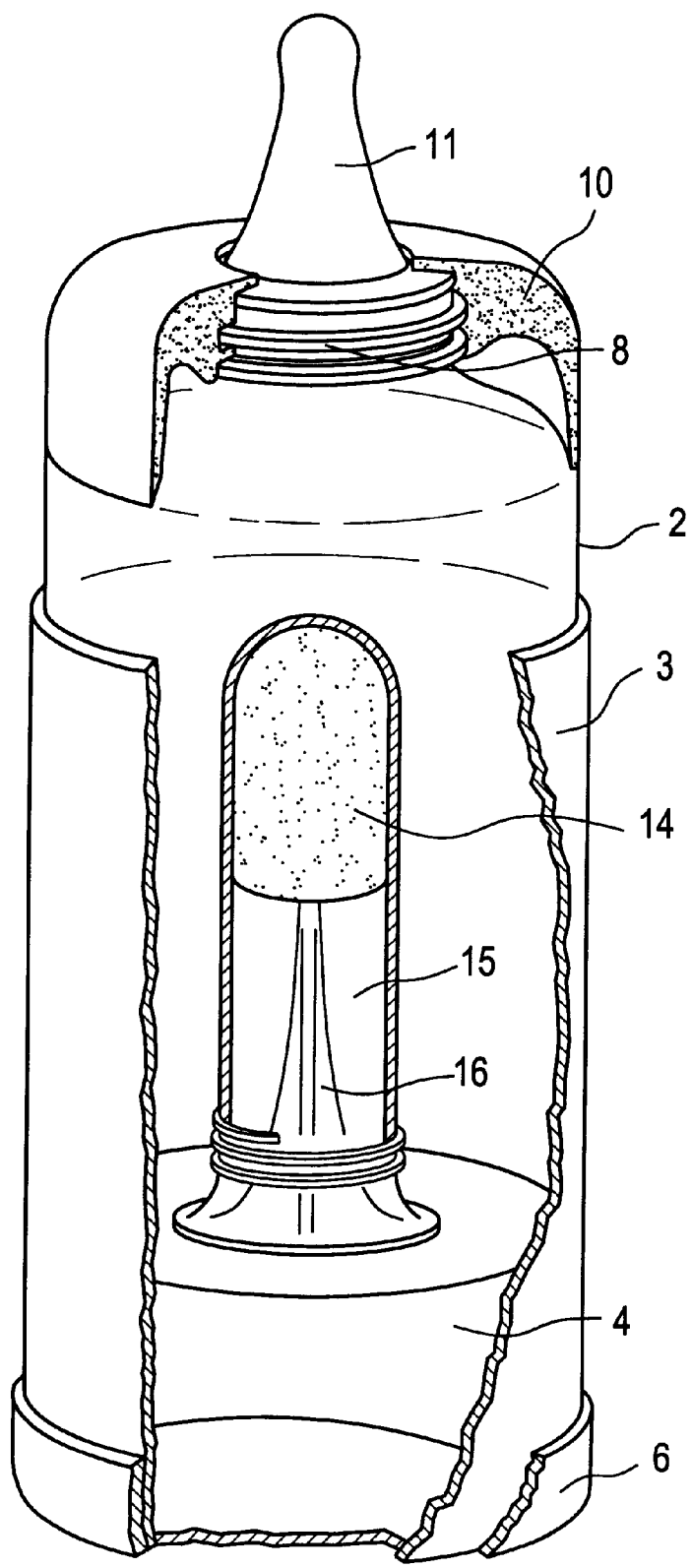
FIG. 2 shows the same feeding bottle where a sealing disc has been replaced with a teat.
Figure 3:
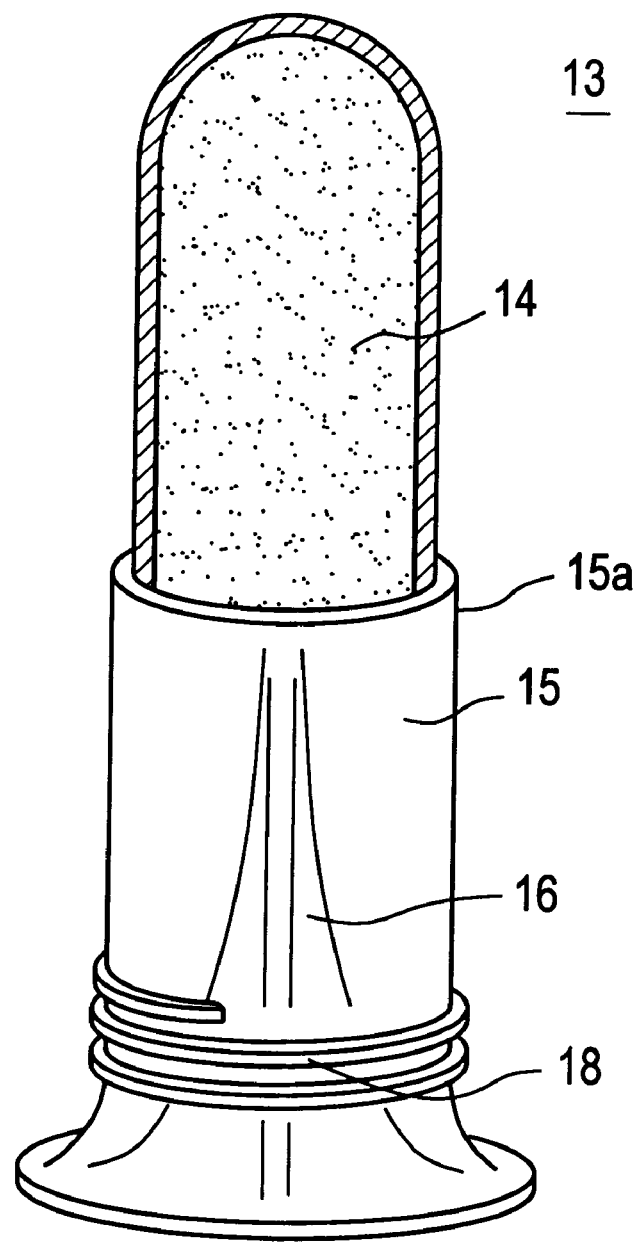
FIG. 3 shows a heating unit.
Figure 4:
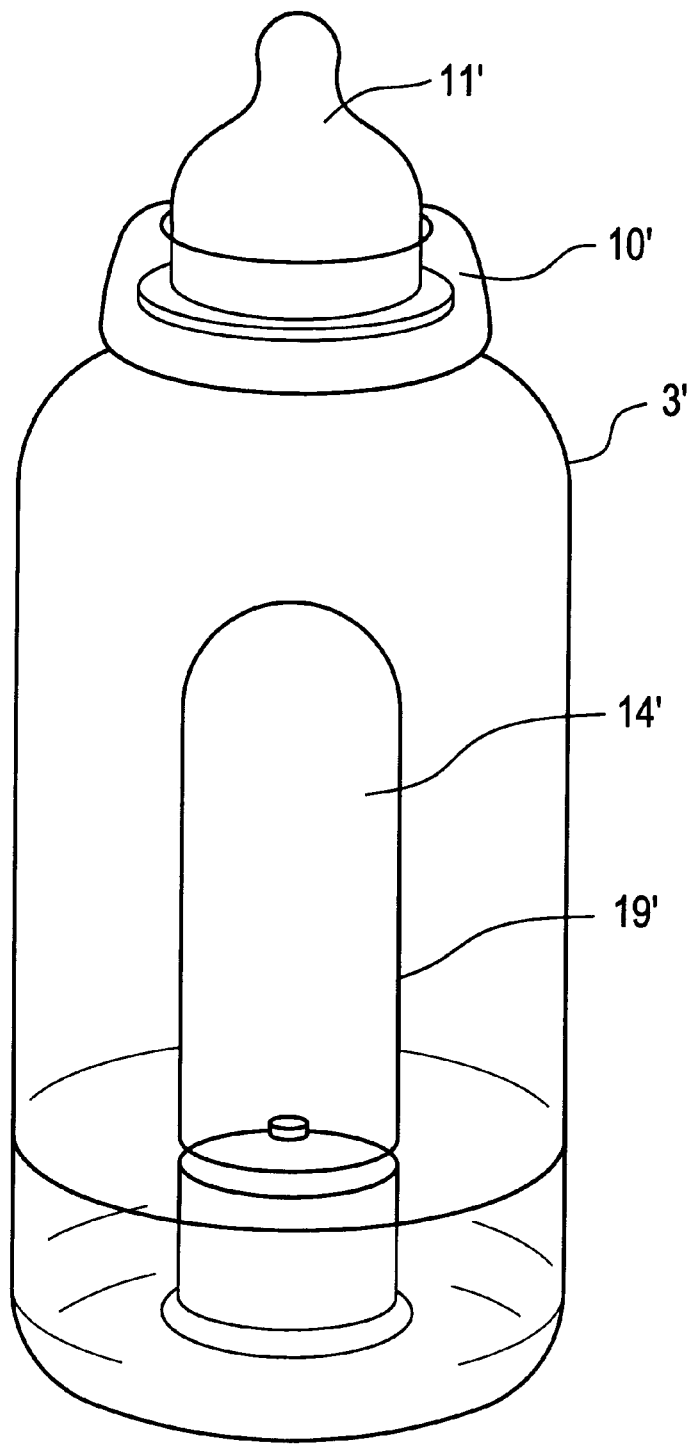
FIG. 4 shows the feeding bottle according to FIG. 2 further developed so that it is similar to a vacuum flask.

The drawings show a feeding bottle 1, suitably made of plastic, but it may of course be made of glass. The bottle 1 is provided at its upper end or neck 7 with a closure 10, suitably utilising screw threading, where the end of the closure 10 can be provided with a sealing disc 9 or, as shown in FIG. 2, a teat 11. The bottle 2 has a cylindrical space 12 emanating from the bottom of the bottle 2, said cylindrical space being closed at its upper end and open at its lower end, the space 12 thus being separated from the contents of the bottle. A sleeve 3 is fitted over the actual bottle 2. The sleeve 3 may be provided with advertising material and is longer than the bottle 2 itself so that a cylindrical space 4 is formed beneath the bottom of the bottle 2. Said cylindrical space 4 can be closed by means of a lid 6. The bottle 2 may thus contain water and the cylindrical space may contain a packet 5 of milk powder and also a teat 11. The heating unit 13 can be attached in some way or another in the cylindrical cavity 12, e.g. by means of screw threads 17 and 18. The heating unit consists of two spaces 14 and 15 separated from each other by a diaphragm. In the two spaces 14 and 15 are two substances, e.g. water and calcium chloride. Said diaphragm is penetrated by a special penetrating device 16 and the two substances are then mixed in the heating unit 13 by shaking the bottle to that heat is generated.

Said heating unit may also consist of a battery with a resistance loop that generates heat.

The feeding bottle 2 described above is extremely handy to use when transported cold with milk powder 5 and a teat 11 in the space 4 and a heating unit 13 in the space 12. The space beneath the bottom of the bottle 2 is opened, after having first unscrewed the lid 10. The sealing disc 9 is removed and replaced with a teat 11 and the unit 13 is activated so that only the two spaces 14 and 15 are combined by penetration when they contain two substances, so that heat is generated as the two substances are mixed together. If an electric unit is used, all that is required is for the switch to be activated.

As is clear from the above description, a feeding bottle has been provided which can be prepared for travel or for use. When the feeding bottle is ready for transport the teat 11 and milk substance 5 are protected in the space 4 beneath the bottom of the bottle. When the bottle 2 is to be used where no heating source is available, the sealing disc 9 is merely replaced with the teat 11 and the heating unit 13 initiated so that heat is generated. Heat is usually generated by shaking the bottle to mix the two substances together.

When using a feeding bottle of the type described above, the contents of the bottle sometimes needs to be kept warm for some time and the bottle described thus lacks the desired vacuum-flask characteristics. However, this can be solved by providing the exterior of the bottle and its bottom with a layer of suitable known material having the ability to keep the enclosed bottom at the heated temperature for a considerable period of time. Another way of arranging this is for the bottle itself to have a wall in the nature of a vacuum flask, i.e. most of the wall is double, the walls being spaced from each other to define a space as in a vacuum flask. The wall and bottom of the bottle are thus double whereas the wall enclosing the space that emanates from the bottom of the bottle is not double-walled, thus enabling heat to be conducted from said space to the contents of the bottle.

Figure 5:
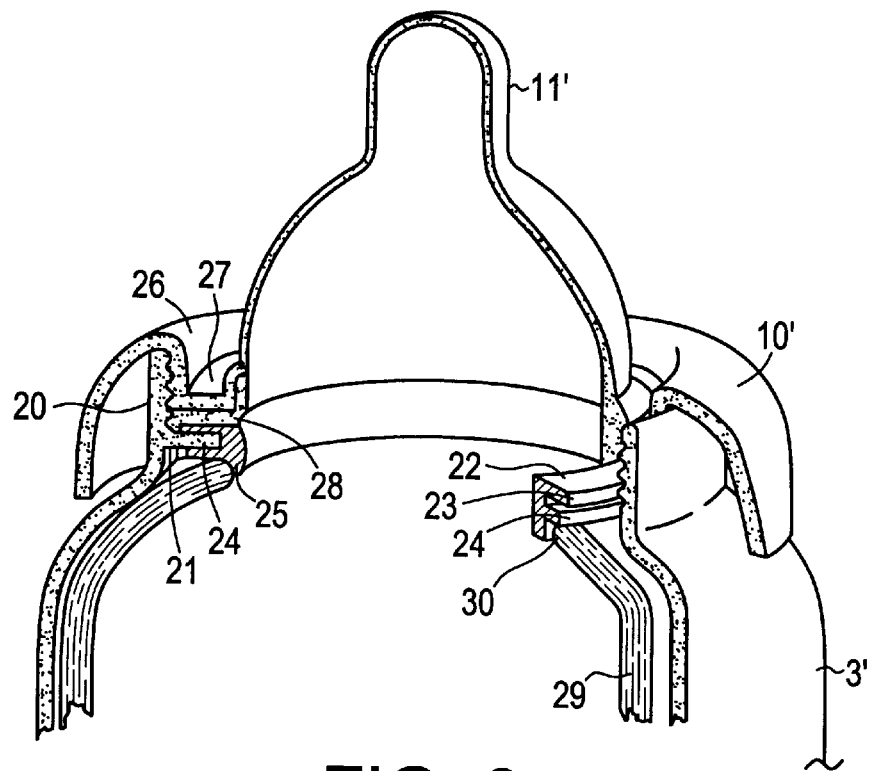
FIG. 5 shows a longitudinal section through the upper part of the feeding bottle according to FIG. 4.
Figure 6:
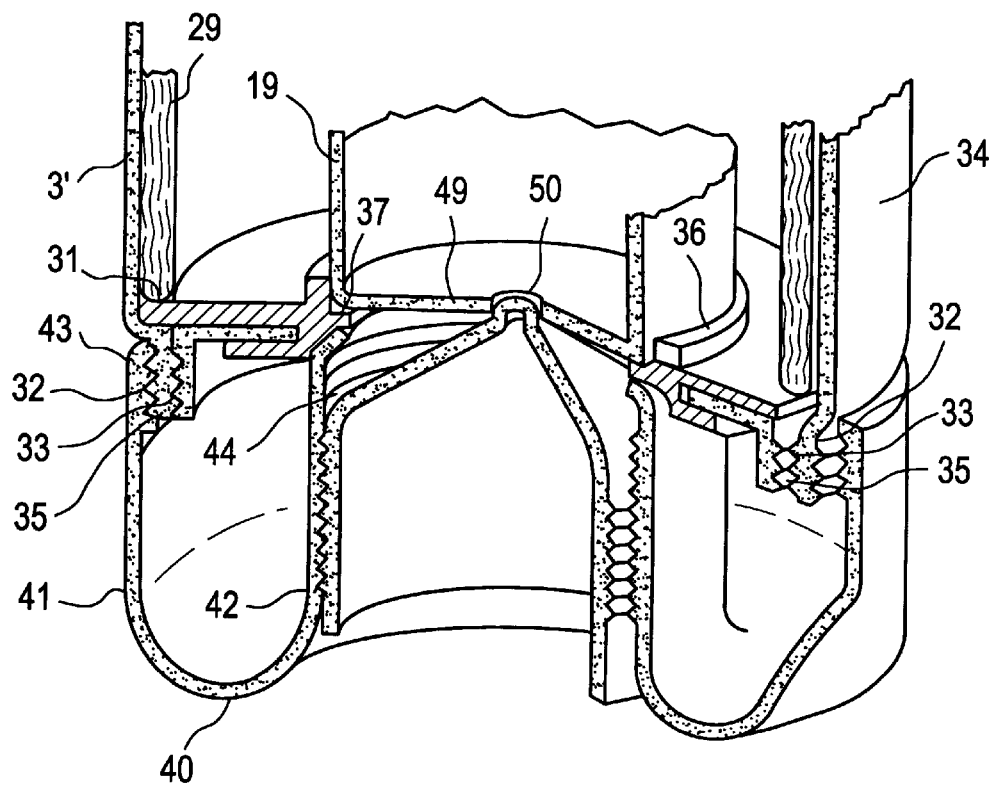
FIG. 6 shows a longitudinal section through the bottom part of the feeding bottle according to FIG. 4.

FIGS. 4 to 7 show an embodiment of a feeding bottle similar to a vacuum flask. The actual vacuum-flask part of the bottle is in the form of a double-casing tube 29, enclosing a space. The tube is cylindrical but curves inwards at the top to an end point 30. Said tube has the chracteristics of a vacuum flask. The tube is surrounded by a casing 3' shaped at the top as a neck 20 with internal threading. The casing may be made of any suitable material, e.g. plastic. The neck 20 is provided with an inwardly directed peripheral flange 21 on which an annular peripheral seal 22 is arranged. This seal may be of rubber or some other suitable material. The seal has two outwardly directed flanges 23 and 24 that cooperate with the peripheral flange 21. The seal 22 also has a tubular part 25 designed to function as support for the tubular end 30 of the vacuum-flask part together with the peripheral flange 24. The peripheral flange 23 is designed to function as a contact surface for a peripheral flange 28 of a teat 11'. This peripheral flange 28 can be replaced with a circular disc covering the opening of the bottle when the teat is not in function. The peripheral flange 28 is held in place by means of a flange 27 secured to a bottle closure 10' having an internal tubular part 26, said tubular part having an external thread cooperating with the thread on the neck 20. The lower end of the casing 3' is provided with an external thread 32 and an internal thread 33. The internal thread cooperates with the external thread 35 on a tubular retaining part 34 which has an inwardly directed flange. Above the surface of the flange is a tubular seal with two outwardly directed peripheral flanges 38 and 39 and an inwardly directed flange 37. The seal may be made of any suitable material, e.g. rubber. The lower end 31 of the container wall 39 is in contact with the upper side of the flange 38. The lower edge of the container 19 abuts the flange 37, this container being in the form of an inverted test tube sealed by a disc 49 with a central hole 50. The container 19 may be of any suitable material, e.g. glass or plastic. The lower end 31 of the casing is detachably joined to a tubular end closure which is double-walled, open at its upper end and closed at its lower end so that the end closure has annular form and a cross section that is U-shaped. The outer wall 41 of the annular closure is provided with an internal thread 43 at its upper end, cooperating with the external thread 32 at the lower end of the sleeve 3'. The inner wall 42 of the sleeve is folded inwards at the top, the inwardly folded edge being designated 44. The inwardly folded edge is designed to function as support for the inwardly directed peripheral flange 37. The lower edge of the container 19 thus rests on the flange 37. The inner wall 42 of the annular closure is provided with an external thread 42 designed to cooperate with the external thread 46 on a vessel 45 which is closed at one end and provided with a plug 48. As can be seen in FIG. 6 the plug 48 is intended to close the central hole 50. The position of the cylindrical vessel shown in FIG. 6 is the position assumed by the vessel when the feeding bottle is in used.

Figure 7:
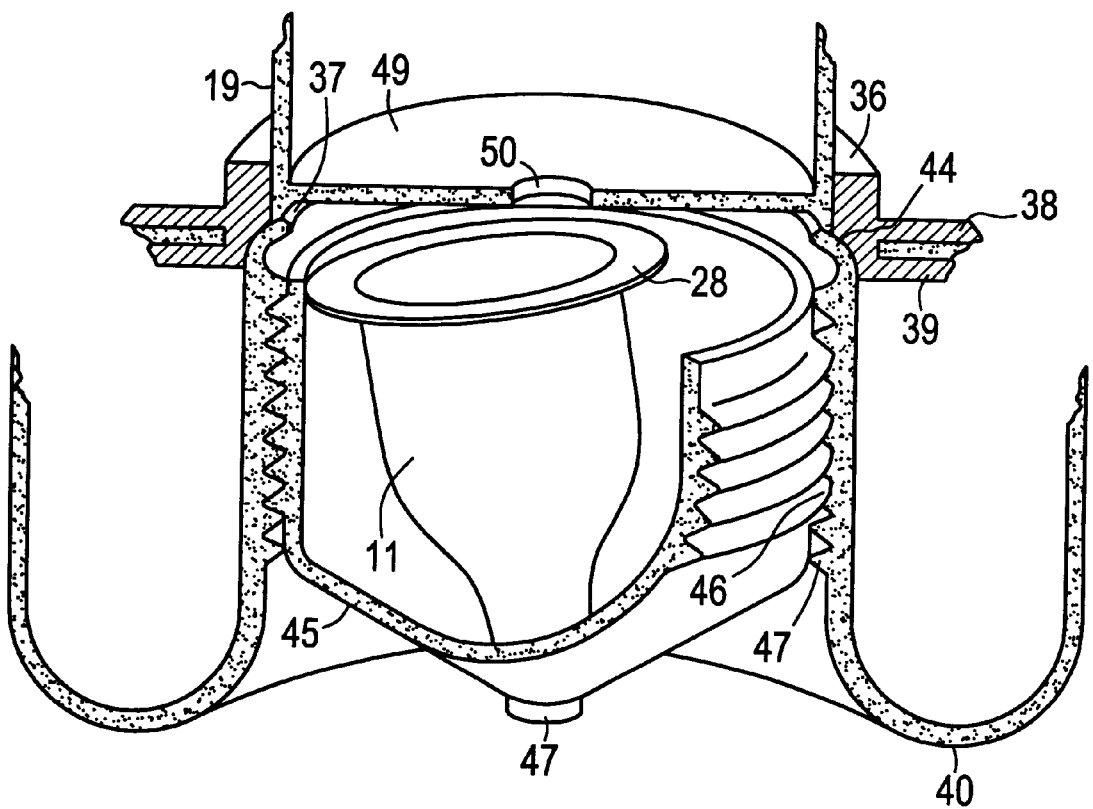
FIG. 7 shows a longitudinal section through the bottom part of the feeding bottle with a teat in the storage space.

FIG. 7 shows the vessel 45 inverted and screwed into the annular end closure 40. In this position the vessel acts as container for a teat 11' with flange 28.

The bottle described above functions in the following manner.

It is assumed that the feeding bottle according to FIG. 5 has a sealing disc placed on its upper end as shown in FIG. 5 and that the teat is situated in the space as shown in FIG. 7. The cylindrical vessel 45 is now screwed out of its original position, thus exposing the teat. The closure 10' is then removed and the sealing disc at the upper end of the bottle is removed and replaced with the teat 11', the flange 28 of which will then abut the flange 23 and the clamped against this by the flange 27 when the end closure 10' is screwed on. When this has been done the container 19 is filled with a suitable chemical composition so that a heating process is started. When the space is full the cylindrical vessel 45 is inverted and screwed in so that its plug 48 closes the central hole 50. A heat-generating process is then initiated and when this is complete, a heated product will retain its temperature thanks to the thermos-like properties of the wall 29 of the vessel. In this case also any heat-generating arrangement, e.g. an electric arrangement, may be placed in the space 14. The end wall 49 must be adapted to suit the heat-generating arrangement selected.

It should be obvious that the attachment between the lower end of the casing and the outer wall of the annular end closure is such that it is easy to exchange the actual bottle wall 29 in the form of a vacuum flask.

What is claimed is:

1. A feeding bottle comprising:

an elongated and generally cylindrical outer wall having a screwthreaded first opening at a first end thereof constructed and arranged for attachment of a cap and nipple thereto, and at an opposite end thereof folding inwardly towards the first end defining a second opening, and terminating to form a closed portion within the bottle and forming thereby a first storage space for feeding material including the first opening, said first storage space extending to the opposite end, the closed portion further defining a second storage space accessible through the second opening and tapering toward the first end, the second opening having a diameter substantially coextensive with the opposite end, the first and second storage spaces being coextensive over a substantial length;

a closure for the second opening;

a screwthreaded cap for the first opening which is removable to enable attachment of the nipple;

a nipple constructed and arranged for attachment to the bottle at the first end;

a removable and initiable temperature adjusting unit constructed and arranged for placement in an upper portion of said storage space for adjusting the temperature of the feeding material in said first storage space, said temperature adjusting unit corresponding in shape to the upper portion of said storage space, a remaining portion of said storage space being defined between the upper portion and the second opening, the remaining portion being sized to accommodate the nipple for storage therein.

2. The feeding bottle of claim 1, wherein the cap comprises a screwthreaded outer portion having a central opening therein for receipt of the nipple, and a central disk for sealing the central opening and which is removable for insertion of the nipple through the central opening.

3. The feeding bottle of claim 1, additionally comprising a sleeve fitted over the outer wall to increase rigidity of the bottle, and which extends past the opposite end.

4. The feeding bottle of claim 1, wherein the temperature adjusting unit is a heating unit.

5. The feeding bottle of claim 4, wherein the heating unit is a chemical heating unit.

6. The feeding bottle of claim 5, wherein the chemical heating unit comprises first and second compartments separated by a diaphragm, and means for puncturing the diaphragm, the first and second compartments each containing a component such that an exothermic reaction results from mixing the components.

7. The feeding bottle of claim 1, wherein a portion of the outer wall comprises insulation against heat loss.

8. The feeding bottle of claim 1, wherein the insulation comprises a double wall with a vacuum space therebetween.

9. The feeding bottle of claim 1, wherein the outer wall has a plastic coating thereon.

\* \* \* \* \*